Nov. 10, 1936.   J. T. ZURCHER   2,060,362
DUSTPROOF LUGGAGE CARRIER FOR AUTOMOBILES
Filed Oct. 29, 1934

Inventor
John T. Zurcher
Lynn H. Latta
By
Attorney

Patented Nov. 10, 1936

2,060,362

UNITED STATES PATENT OFFICE 2,060,362

DUSTPROOF LUGGAGE CARRIER FOR AUTOMOBILES

John T. Zurcher, Tripp, S. Dak.

Application October 29, 1934, Serial No. 750,518

2 Claims. (Cl. 296—1)

My invention relates to a dust proof protector to be installed in the rear of a coupé type of automobile.

An object of my invention is to provide such a protector which will completely inclose the interior of such vehicles on the inside to provide convenient accessibility to the contents thereof.

A further object of my invention is to provide means for insuring perfectly tight closure of the carrier so that dust, snow or ice cannot enter therein.

A further object of my invention is to provide means for allowing convenient opening of the luggage carrier.

A further object of my invention is to provide means for incorporating the carrier in the usual type of coupé or the type having a folding seat in the rear.

A further object of my invention is to provide the above mentioned objects in a construction of the greatest simplicity.

Figure 1:
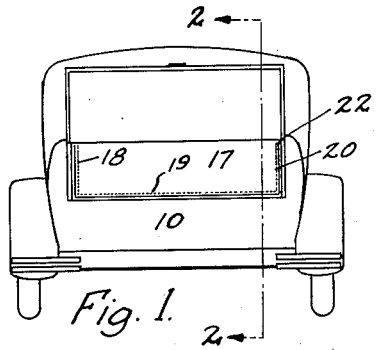
Figure 2:
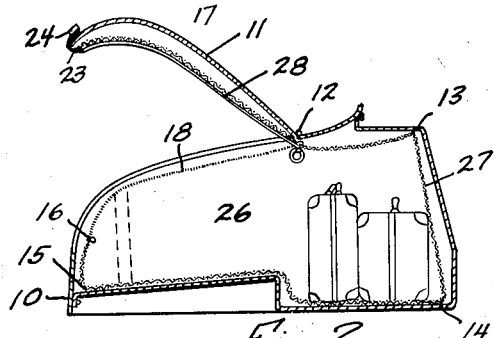
Figures 3, 4:
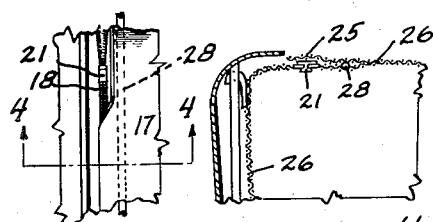
Figure 5:
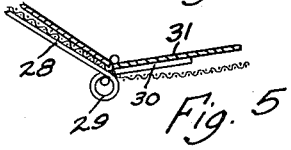
Figure 6:
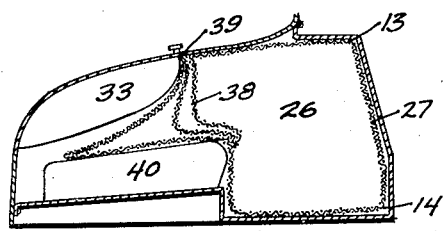
Figure 7:
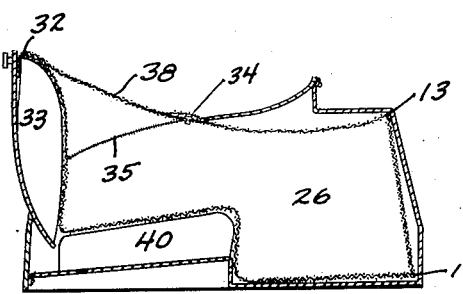
Figure 8:
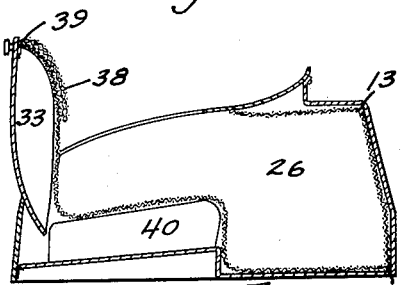
Figure 9:
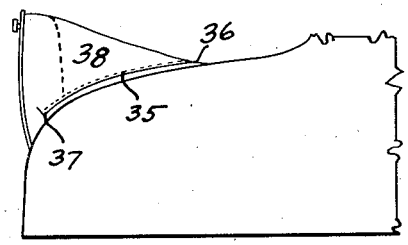
Figures 10, 11:
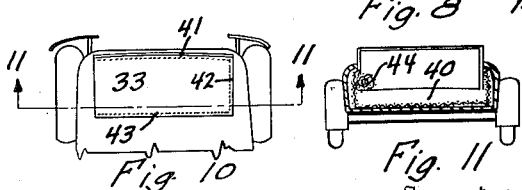

With these and other objects in view, my invention consists in the construction, arrangement and combination of the various parts of my device, whereby the objects contemplated are attained, as hereinafter more fully set forth, pointed out in my claims, and illustrated in the accompanying drawing, in which:

Figure 1 is a rear view of an automobile incorporating my device with the lid raised, Figure 2 is a sectional view of Figure 1 taken along the lines 2—2, Figure 3 is an enlarged detail view of part of the flap inclosing means, Figure 4 is a sectional view of Figure 3 taken generally along the line 4—4 of Figure 3, Figure 5 is an enlarged detail view showing a spring arrangement for lifting the cover, Figure 6 is a sectional view similar to Figure 2 except showing the construction as used in the so-called "rumble" seat, Figure 7 is a similar sectional view except showing the seat in its open position, Figure 8 is a further sectional view showing the opening flap opened up, Figure 9 is a side elevation of Figure 7 taken externally, Figure 10 is a rear view of an automobile showing the modified form of opening flap arrangement, and Figure 11 is a sectional view of Figure 10 taken along the line 11—11.

I have used the reference character 10 to designate generally the rear portion of a coupé. This rear portion includes the swinging lid 11, which is pivoted at 12 in the usual manner.

The carrier of my construction is made of canvas or other similar material and is secured at approximately the points 13, 14, 15 and 16 so as to completely cover the inside surface of the rear end of the vehicle.

This particular carrier or holder is especially adapted for cars used by salesmen for carrying clothing and samples and the like in the rear end.

It usually happens that even after a short trip that the bags and various other paraphernalia in the rear of the car get extremely dusty, or in the winter seasons are covered with snow and ice. This always occurs even though the lid members are fastened in their closed position since there are always small openings about the perimeter of the lid, which allow the entrance of these undesirable factors.

The basic feature of my invention therefore is to inclose the inside of the rear member suitably at the same time allowing entrance to the carrier.

To provide this latter means, I provide the flap 17. The flap 17 hinges approximately adjacent the hinge 12, which end is open at about the lines 18, 19 and 20. (See Figure 1).

The flap 17 is tightly closed by means of a suitable construction such as the "zipper" type, which is shown more clearly in Figure 3 where the fastening element is indicated by the character 21. This is the usual closure type wherein a series of inter-engaging points are compressed together by means of the element 21.

It will be seen then, that when the element 21 is moved from the point 22 such as at Figure 1, and is pushed along the lines represented by the characters 20, 19 and 18, that the flap 17 will be opened and can then be lifted upwardly, and the pliable hook element 23 can be bent over the end of the lid 11 and hooked about the usual handle 24.

The various articles in the carrier can then be reached conveniently.

It will be seen in Figure 4 that I have provided an overlapping arrangement in that the canvas or other suitable material overlaps the opening member 21 as well as the "zipper" arrangement by means of the overlapping flap 25, which is secured to the main body of the canvas at 26.

In this way the opening means are efficiently closed to the elements.

It will be understood of course that this structure of carrier includes the side walls 26. The rest of the structure is indicated by the character 27.

The flap 17 is suitably reinforced by means of a wire frame 28, which is made generally of a U-shape and adapted to fit within the closing arrangement. This provides rigidity to the flap in the case of snow or dust entering within.

A further modification of the opening flap is illustrated in Figure 5. To remedy the inconvenience of lifting the flap 17, this particular arrangement can be employed.

In this case the U-member 28 besides being pivoted about the loop at 29, includes the integral extension 30. In this case the member 28 will be made of suitable spring material.

The member 30, which will bear against the portion 31 of the car, will maintain the flap 17 under tension. As soon as the fasteners are released, the flap will then immediately fly upwardly to the position shown in Figure 2, thus forming a convenient opening arrangement.

This particular form of luggage carrier is also adapted to the modification shown in Figures 6, 7, 8, 9, 10 and 11, which show the structure in use on a vehicle having a collapsible rear seat element. The construction is slightly different in this case and in its collapsed position is shown in Figure 6 and in the open position in Figure 7, namely when the rear seat back is thrown rearwardly.

In this structure the canvas again covers the complete inside of the rear of an automobile, and an examination of Figure 7 will indicate how the structure is adapted to this particular form. In this case the canvas is secured at 32 to the top of the seat back 33 and the fastening element 34 follows the contour indicated in Figure 9 by the characters 35 and 36.

At 36 the opening means will follow a line at right angles to the side opening means 35.

The opening means which is the same as employed in the construction previously shown, will start from the point 37, (see Figure 9), and will then follow this general contour.

It will be seen that when the rear of the vehicle is closed as in Figure 6, that the elements will drape themselves as there shown. However when the flap 38 is opened by the means explained, it can be folded back upon itself as shown in Figure 8 and secured in any suitable manner at 39.

Since the canvas is comparatively thin, it will cause no inconvenience or discomfort to persons riding on the rear seat 40.

If desired, the flap 38 need not be folded as shown and can hang downwardly. Figure 10 discloses a modification of this form, which is similar in all respects with the exception that the flap 38 will be opened along the lines 41, 42 and 43. In this form the flap can be rolled up into the roll 44 as shown in the sectional view in Figure 11.

This roll will be positioned at one side of the seat 40.

It will now be seen that I have provided a protector or luggage carrier which will completely inclose the interior of the rear end of a coupé, which provides means for accessibility, which also provides means for obtaining a tight weather and dust proof inclosure and which can be accommodated in any of the usual types of smaller car constructions.

It will also be seen that I have provided these means in a construction which can be made very simply and is durable and easy of manufacture.

Some changes may be made in the construction and arrangement of the parts of my invention without departing from the real spirit and purpose of my invention, and it is my intention to cover by my claims any modified forms of structure or use of mechanical equivalents, which may be reasonably included within their scope.

I claim as my invention:

1. In combination with an automobile coupé rear portion and rumble seat, a pliable bag adapted to be received within and enclose the rear interior thereof, and means for opening the bag including an integral hinged flap including slide fastener connecting means about the opening perimeter thereof, said flap being hinged about the upper back of the rumble seat, said flap being hinged at one side of the rumble seat to allow rolling of the flap to one side thereof.

2. A luggage carrier for an automobile of the coupé type having a hinged cover, comprising a pliable bag adapted to be received within and completely enclosing the rear interior thereof, means for opening the bag including a hinged flap including a U-shaped stiffening member, said hinged flap adapted to hinge at its upper closed end and arranged to cover the interior surface of the coupé cover, said stiffening member including an integral bent spring extension adapted to lie beneath a portion of the coupé adjacent the hinge of the flap to cause automatic opening of the flap when the same is released, said hinged flap including slide fastener means about the opening perimeter thereof.

JOHN T. ZURCHER.